United States Patent
Hill et al.

(10) Patent No.: US 7,092,794 B1
(45) Date of Patent: Aug. 15, 2006

(54) METHOD AND APPARATUS FOR CONNECTING TO HVAC DEVICE

(75) Inventors: Mark Alexander Hill, LaFayette, NY (US); Mark Damian Morelli, Milan (IT); Robert Paul Dolan, Syracuse, NY (US); Paul W. James, Windsor, CT (US); Gayatri Chaturvedi, Paris (FR); Thomas L. DeWolf, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 405 days.

(21) Appl. No.: 09/679,853

(22) Filed: Oct. 5, 2000

(51) Int. Cl.
*G01M 1/38* (2006.01)

(52) U.S. Cl. ........................ 700/276; 700/108

(58) Field of Classification Search .......... 700/276, 700/109, 275, 3, 9, 31, 108; 340/506; 165/303
See application file for complete search history.

(56) References Cited

U.S. PATENT DOCUMENTS

| | | | | |
|---|---|---|---|---|
| 5,555,509 A | * | 9/1996 | Dolan et al. | 700/276 |
| 5,751,948 A | * | 5/1998 | Dolan et al. | 714/54 |
| 5,818,347 A | * | 10/1998 | Dolan et al. | 340/825.52 |
| 6,211,782 B1 | * | 4/2001 | Sandelman et al. | 340/506 |
| 6,385,497 B1 | * | 5/2002 | Ogushi et al. | 700/110 |
| 6,477,667 B1 | * | 11/2002 | Levi et al. | 714/57 |
| 6,717,513 B1 | * | 4/2004 | Shprecher et al. | 340/506 |
| 2002/0082924 A1 | * | 6/2002 | Koether | 705/15 |
| 2003/0145138 A1 | * | 7/2003 | Motoyama | 710/15 |

FOREIGN PATENT DOCUMENTS

| | | |
|---|---|---|
| WO | 98 53581 | 11/1998 |
| WO | 99 65192 | 11/1999 |
| WO | 00 17984 | 3/2000 |
| WO | 00 36812 | 6/2000 |

* cited by examiner

*Primary Examiner*—Kidest Bahta
(74) *Attorney, Agent, or Firm*—Wall Marjama & Bilinski LLP

(57) ABSTRACT

A system for remotely monitoring and controlling an HVAC device includes a server which receives queries from an entry device and data from the HVAC device. Databases with information regarding the location and status of the HVAC devices reside on the server, as does a user name/password file, instead of in the entry device or the HVAC controller. Connection is provided over various communications links including the Internet, POTS, and GSM networks. A user with an entry device such as a handheld computer or cell phone using wireless access protocol (WAP) can change settings, obtain diagnostic information, and receive alarm messages about a plurality of HVAC devices.

15 Claims, 7 Drawing Sheets

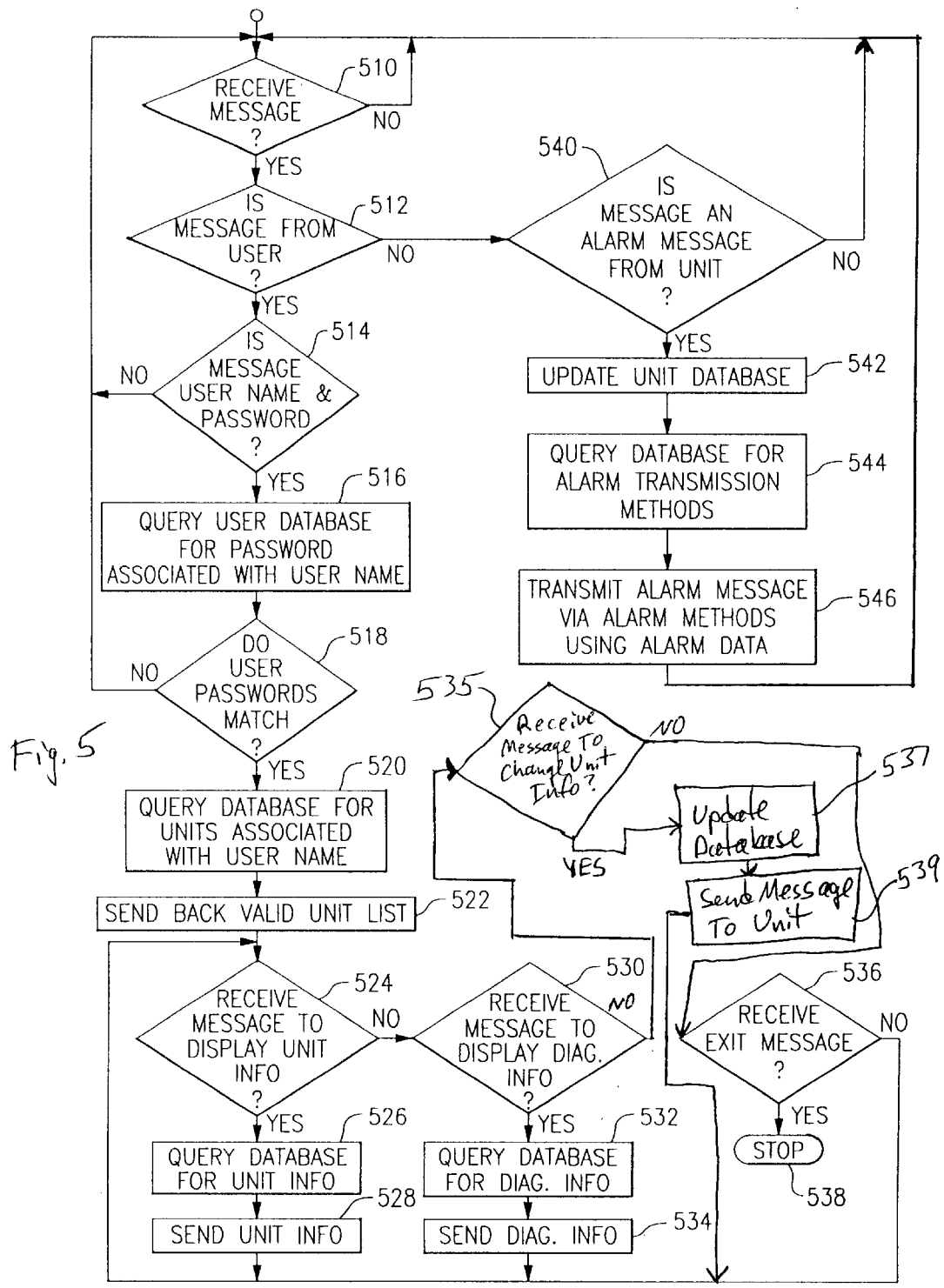

USER DATABASE

| USER NAME | PASSWORD | UNIT 1 | UNIT 2 | ... | UNIT N |
|---|---|---|---|---|---|
| CARRIER 1 | 123456 | OFFICE | MILAN | ... | FRANCE |
| CARRIER 2 | 654321 | LOBBY | MILAN | ... |  |

Fig. 6

UNIT DATABASE

| UNIT NAME | UNIT PHONE # | POWER | MODE | ROOM TEMP | SETPOINT | FAN SPEED | LOWER | TIMER | DIAGNOSTIC | ALARM METHOD 1 | ALARM DATA 1 |
|---|---|---|---|---|---|---|---|---|---|---|---|
| OFFICE | (123)456-7890 | ON | HEAT | 22 | 22 | LOW | 1 | OFF | NONE | E-MAIL | XYZ@CARRIER.UTC.COM |
| MILAN | (234)567-8901 | OFF | OFF | 23 | 22 | OFF | HOME | OFF | NONE | PHONE | (555)123-4567 |
| FRANCE | (345)678-9012 | ON | COOL | 24 | 22 | MEDIUM | 6 | OFF | NONE | E-MAIL | XYZ@CARRIER.UTC.COM |
| LOBBY | (456)789-0123 | ON | FAIL | 25 | 22 | OFF | HOME | OFF | ROOM AIR | SMS | (555)234-5678 |

Fig. 7

METHOD AND APPARATUS FOR CONNECTING TO HVAC DEVICE

FIELD OF THE INVENTION

This invention relates to connecting to HVAC units, and in particular, to monitoring and controlling HVAC units via the Internet and or the GSM (Global System for Mobile) Network.

BACKGROUND OF THE INVENTION

HVAC equipment is becoming more and more automated. Along with this automation comes the desire to control and diagnose the equipment from a distance. Data controllers for furnaces and air conditioning equipment are frequently "smart" devices capable of transmitting data including alarms to a targeted device. This targeted device may be a dedicated computer or a computer identified for receiving the communications from the particular HVAC device. In either case, the targeted computer is the end of the communication link as opposed to any further routing of the communication. A need exists to have the ability to monitor and control HVAC devices from other than the device itself or a remote computer in a central location.

SUMMARY OF THE INVENTION

Briefly stated, a system for remotely monitoring and controlling an HVAC device includes a server which receives queries from an entry device and data from the HVAC device. The server is operative to form a communication link between the entry device and the HVAC device so as to allow data transfer to take place pursuant to the query. The server preferably forms the communication link using a database of information which resides on the server and includes the location and status of the HVAC devices, as does a user name/password file, instead of in the entry device or the HVAC controller. Connection is provided over various communications links including the Internet, POTS, and GSM networks. A user with an entry device such as a handheld computer or cell phone using wireless access protocol (WAP) can change settings, obtain diagnostic information, and receive alarm messages about a plurality of HVAC devices.

According to an embodiment of the invention, a system for remotely monitoring and controlling at least one HVAC device includes a server with communications access to an entry device and the at least one HVAC device; querying means for querying the at least one HVAC device for status information on a regular basis or when requested by a message from the entry device; and means for sending the status information to the entry device in response to the querying.

According to an embodiment of the invention, a system for remotely monitoring and controlling at least one HVAC device includes a server with communications access to an entry device and the at least one HVAC device; querying means for querying the at least one HVAC device for status information when requested by a message from the entry device; means for sending the status information to the entry device in response to the querying means; means residing in the server for checking for messages from the at least one HVAC device; means residing in the server for sending an alarm message to the entry device when an alarm message is received from the at least one HVAC device; means for automatically sending alarm messages from the at least one HVAC device through the server to the entry device; a database in the server relating to a status of the at least one HVAC device; means for automatically updating the database on a regular basis in the absence of the message form the entry device; and means for changing settings on the at least one HVAC device from the entry device.

According to an embodiment of the invention, a method for remotely monitoring and controlling at least one HVAC device includes the steps of (a) providing a server with communications access to an entry device and the at least one HVAC device; (b) querying the at least one HVAC device for status information when requested by a message from the entry device; and (c) sending the status information to the entry device in response to the querying means.

According to an embodiment of the invention, a method for remotely monitoring and controlling at least one HVAC device includes the steps of (a) providing a server with communications access to an entry device and the at least one HVAC device; (b) querying the at least one HVAC device for status information on a regular basis or when requested by a message from the entry device; (c) sending the status information to the entry device in response to the querying; (d) checking for messages from the at least one HVAC device; (e) automatically updating a database in the server relating to a status of the at least one HVAC device on a regular basis in the absence of the message form the entry device; and (f) changing settings on the at least one HVAC device from the entry device.

BRIEF DESCRIPTION OF THE DRAWINGS

FIG. 5 shows a flow chart of a server program according to an embodiment of the invention.

FIG. 6 shows an example of a user database structure used in an embodiment of the invention.

FIG. 7 shows an example of a unit database structure used in an embodiment of the invention.

DETAILED DESCRIPTION OF THE PREFERRED EMBODIMENT

Figure 1:
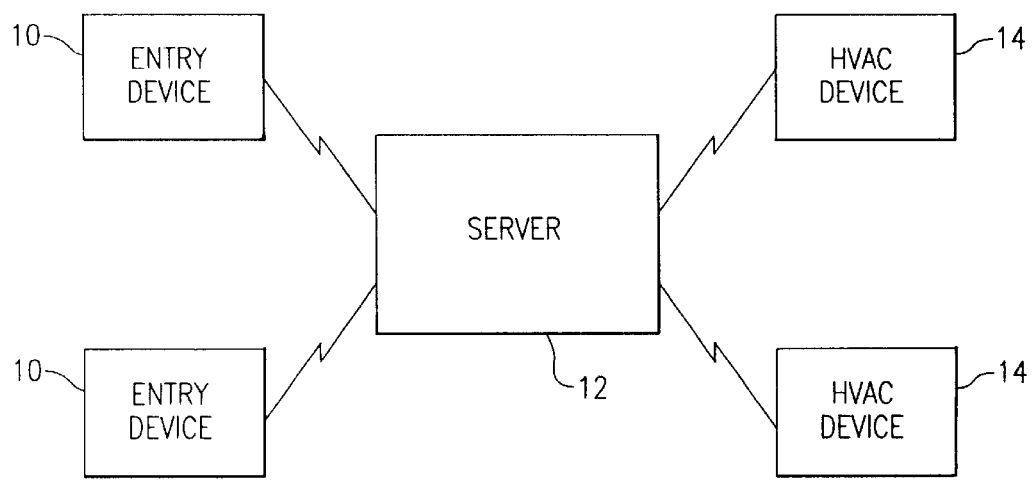
FIG. 1 shows a block diagram of the hardware used according to an embodiment of the invention.

Referring to FIG. 1, an entry device 10 such as a WAP (Wireless Access Protocol) cell phone, a handheld computer, or a PDA (Personal Data Assistant) connects to a server 12 either via the Internet or a GSM/Internet interface. Entry device 10 is any device that allows a user to enter or receive data, whether over wireless or wired communication paths. Server 12 in turn is connected to an HVAC device 14 through the Internet or some other communication link such as the GSM Network or POTS (plain old telephone system) network. A user uses entry device 10 to access diagnostic or status information relating to HVAC device 14. Typical users include an individual owner who wishes to change a setpoint, a service technician who wishes to check diagnostic information, or a building supervisor who wishes to control a number of devices.

Figure 2A:
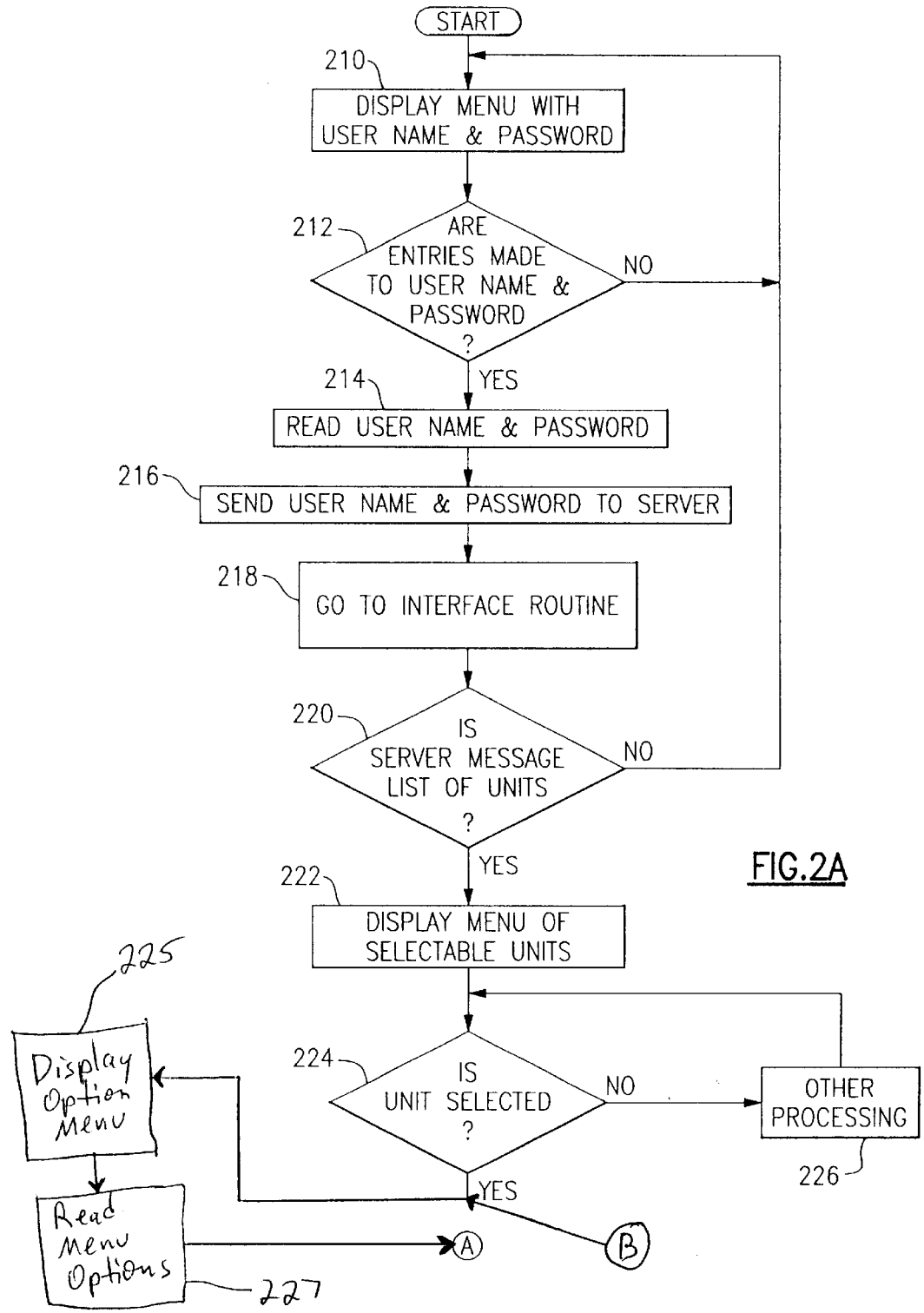
FIGS. 2A–2B show a flow chart of an entry device program according to an embodiment of the invention.
Figure 2B:
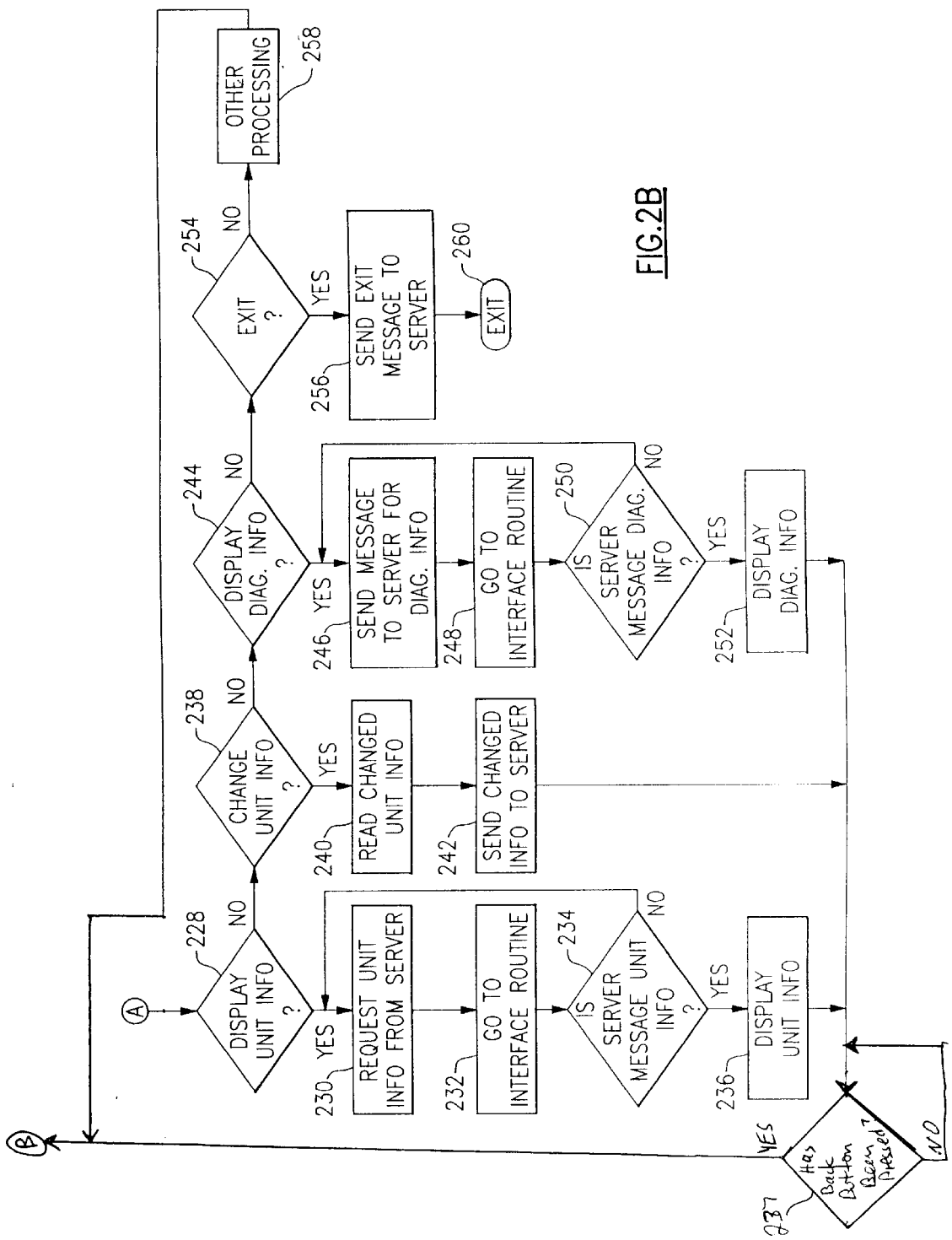

Referring to FIG. 2, an example of a program in entry device 10 is shown. The program begins by displaying a menu requesting input for a user name and password in step 210. In step 212, the program checks for entries. If no entries are received, the program cycles back to step 210. If entries are received, the entries are read in step 214 and sent to server 12 in step 216, after which an interface subroutine (FIG. 3) is invoked in step 218. The interface routine looks for messages from the server and returns control to the entry device program when a non-alarm message is received. After program control is passed back from the interface subroutine, the server message is checked in step 220 to see if the message consists of a list of units. The list of units differs depending on the user name, e.g., a homeowner only receives the units in his or her home, while a building supervisor receives the units under his supervision.

If the message consists of a list of units, the list of units is displayed in step 222. If not, control returns to the beginning of the program. In step 224, the program looks for input to see if one of the units displayed in step 222 is selected. Until a unit is selected, other system processing occurs. Once a unit is selected, a display option menu is displayed in step 225. The menu options are read in step 227. These options are shown in steps 228, 238, 244, and 254. If none of these options are chosen, other system processing occurs in step 258 and program control reverts to step 225.

When unit information should be displayed in response to the question of step 228, the unit information is requested from server 12 in step 230. Program control then enters the interface subroutine in step 232. After control is passed back from the interface subroutine, the server message is checked in step 234 to see if it is the unit information requested. If so, the unit information, such as the room temperature, set point information, status of operability of certain components of the HVAC device as may be noted in FIG. 7. is displayed in step 236 and program control goes to step 225 after a back button is pressed in step 237.

When there is a change to the unit information in response to the question of step 238, the changed unit information is read in step 240 and the changed information sent to server 12 in step 242, after which program control goes to step 225 after the back button is pressed in step 237.

When diagnostic information should be displayed in response to the question in step 244, a message is sent to the server in step 246, after which the interface subroutine is invoked in step 248. After control is passed back from the interface subroutine, the server message is checked in step 250 to see if it is the diagnostic information requested. If not, steps 246, 248, and 250 are repeated. If so, the diagnostic information is displayed in step 252 and program control goes to step 225 after the back button is pressed in step 237.

When the user chooses to exit in step 254, an exit message is sent to server 12 in step 256 and the user exits the program in step 260.

Figure 3:
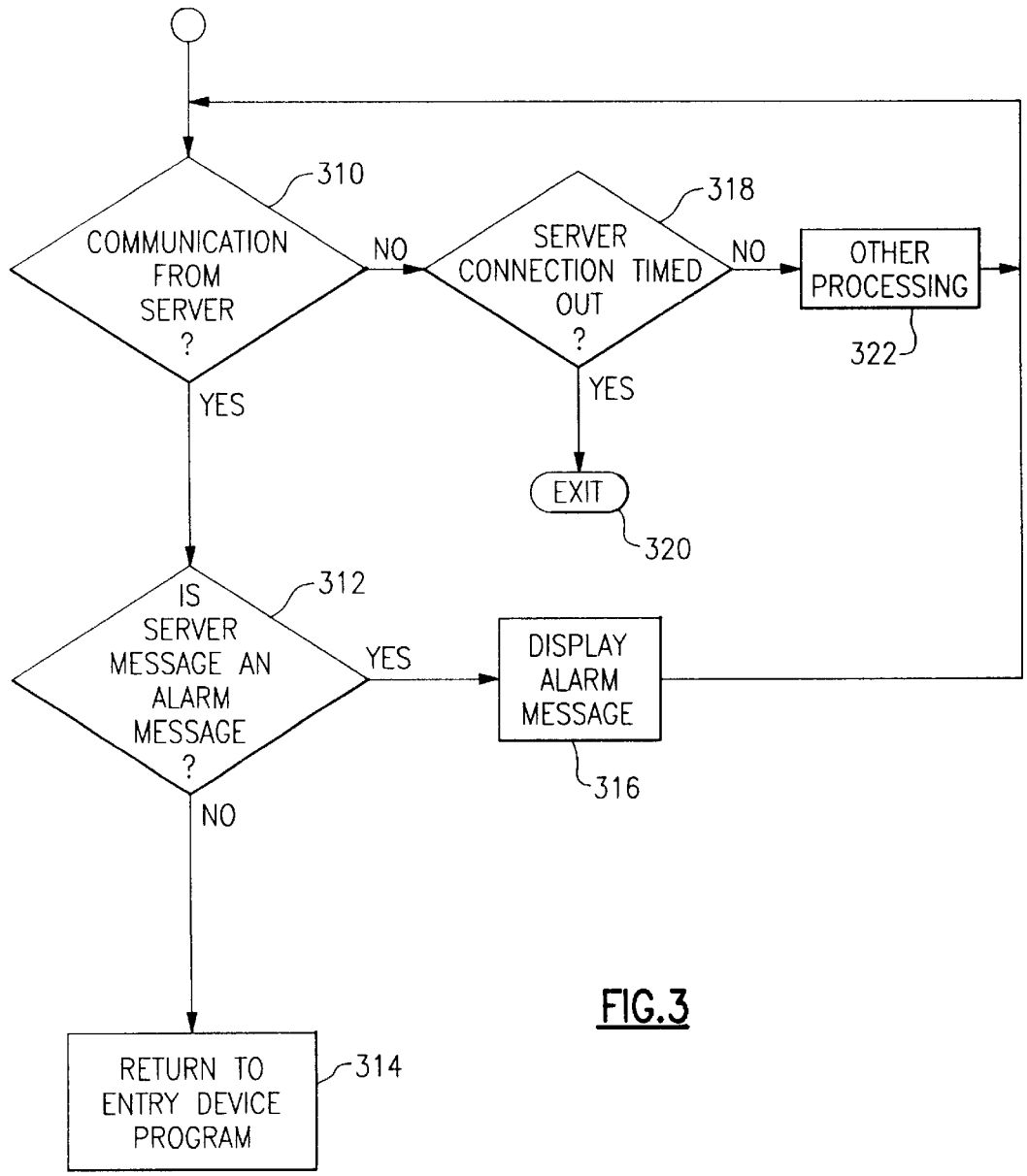
FIG. 3 shows a flow chart of an interface subroutine used in an embodiment of the invention.

Referring to FIG. 3, the interface subroutine checks for a communication from server 12 in step 310. If no message, the program checks in step 318 to see if the server connection has timed out. If so, the subroutine exits in step 320. If the server connection has not timed out, other processing occurs in step 322, after which the subroutine returns to step 310 to look for communications from server 12. If a message is received from server 12, it is checked in step 312 to see if it is an alarm message. If so, the alarm message is displayed in step 316 after which the subroutine returns to step 310. If the message is not an alarm message, the subroutine passes control back to the primary program in step 314.

Figure 4:
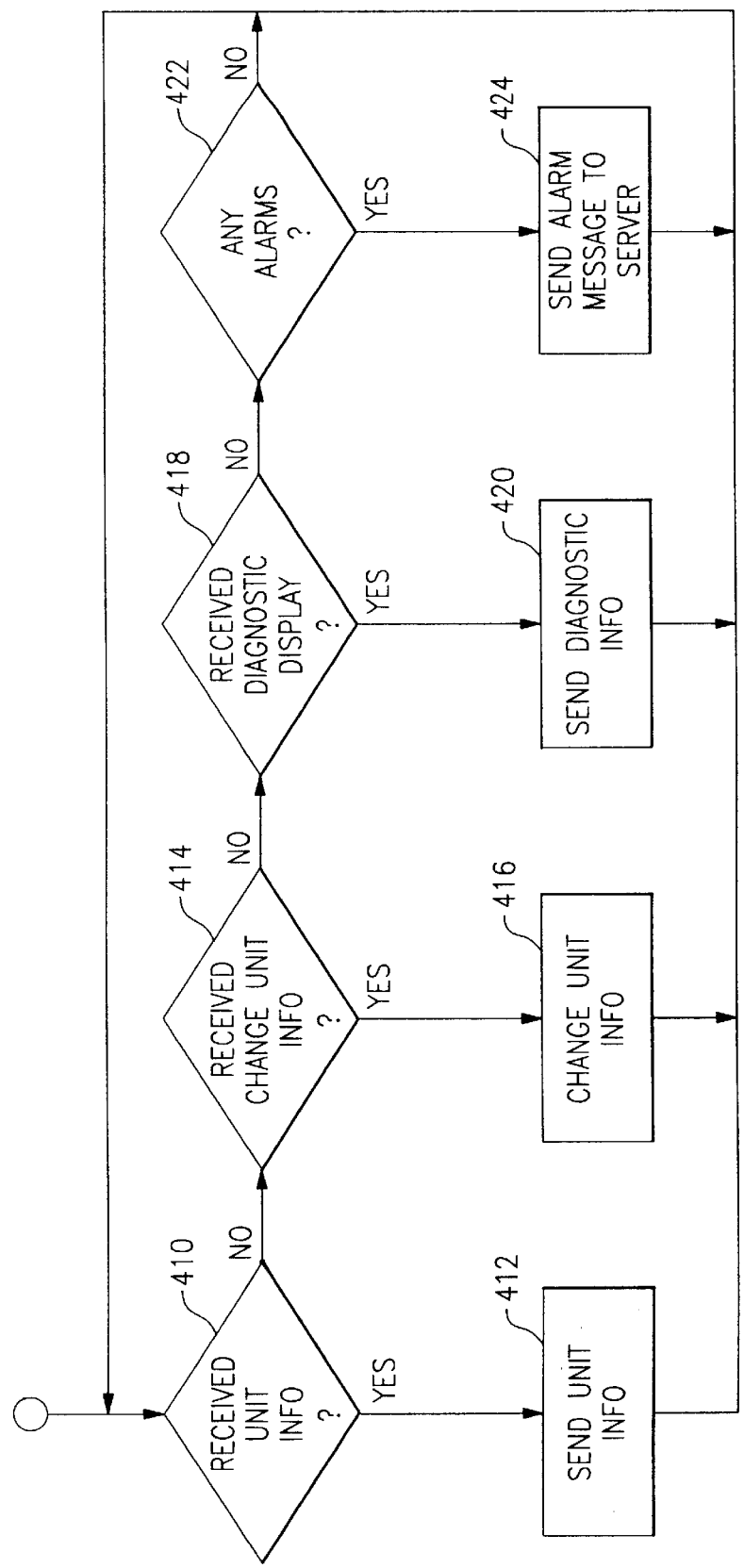
FIG. 4 shows a flow chart of an HVAC device program according to an embodiment of the invention.

Referring to FIG. 4, an example of a program in HVAC device 14 is shown. In step 410, the program checks to see if a request for unit information has been received from server 12. If so, the unit information is sent to server 12 in step 412, after which the program returns to step 410. If no request for unit information is received, the program checks to see if a request to change the unit information has been received in step 414. If so, the unit information is changed in step 416, after which the program returns to step 410. If not, the program checks in step 418 to see if a request for diagnostic information is received, and if so, the diagnostic information is sent to server 12 in step 420. If not, the program checks for any alarms in step 422. If alarms are present, an alarm message is sent to server 12 in step 424. If no alarms are present, the program returns to step 410.

Based on the information in the database (FIG. 7), server 12 determines where and how to send an alarm message to a user or other program. The alarm method indicates how the alarm message will be sent, while the alarm data indicates the destination address or phone number where the alarm message is sent. Multiple addressees are optional.

Referring to FIG. 5, an example of a server program is shown. In step 510, server 12 checks to see if a message has been received. If not, the program waits at step 510 until a message is received. Once a message is received, it is checked in step 512 to see if it is from a user, and if not, it is checked in step 540 to see if it is an alarm message from a unit. If not, control passes back to step 510. If it is an alarm message, the unit database is updated in step 542, after which the database is queried for alarm transmission methods in step 544. In step 546, the alarm message is transmitted via the alarm transmission methods, after which program control goes back to step 510.

If the message in step 512 is from a user, the message is checked in step 514 to see if the message contains the user name and password. If not, the program reverts to step 510. If so, the user database is queried in step 516 for the password associated with the user name. If the password and name don't match in step 518, the program reverts to step 510. If there is a match, the database is queried in step 520 for the HVAC units associated with the user name. A valid unit list is sent back in step 522. Then, in step 524, server 12 checks to see if a message has been received to display unit information such as that shown in FIG. 7. If so, the database is queried in step 526 for the unit information, after which the unit information is sent in step 528 and control passes to step 524.

In step 530, server 12 checks to see if a message has been received to display diagnostic information such as that shown in FIG. 7. If so, the database is queried in step 532 for the diagnostic information, after which the diagnostic information is sent in step 534. Control then passes to step 524.

In step 537, server 12 checks to see if a message has been received to change unit information such as that shown in FIG. 7. If so, the database is updated in step 537, after which a message is sent to the unit in step 539. Control then passes to step 536.

In step 536, server 12 checks to see if an exit message has been received, and if so, the program stops. If not, control passes to step 524.

Referring to FIG. 6, an example of the user database is shown. The user name is stored along with the user password and the information regarding which units are associated with the user name.

Referring to FIG. 7, an example of the unit database is shown. The items shown in the unit database are not meant to be limiting. The unit name is followed by the phone number, the power status, the mode status, the room temperature, the setpoint, the fan speed, the louver position, the timer status, diagnostic messages, alarm methods (which can include multiple alarm methods per unit), and the alarm data for sending an alarm message by one of the alarm methods. Status information on the HVAC devices which is contained in the unit database is either updated on a regular basis or when requested by a message from the entry device. That is, status information can be sent to the server by the HVAC controller on a regular basis, or the server can request the status information from the HVAC controller on a regular basis, in addition to or in place of the server requesting status information in response to a message from the entry device. The structure of the database is preferably changeable by a system administrator so as to add or delete fields monitored or controlled through the server.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A system for remotely monitoring and controlling at least one HVAC device comprising:

a server with bi-directional communications access to an entry device and at least one HVAC device and containing stored information relating to the status of said at least one HVAC device and further containing stored information that includes a password and a user name that are associated with said at least one HVAC device which must be properly identified before stored status information can be accessed by the entry device;

querying means in said server for querying said at least one HVAC device for status information for storage in said server on demand in order to detect a problem associated with the monitoring of the at least one HVAC device as well as to detect any problems with the monitored device itself; and means for sending said status information to said entry device when the message from said entry device includes a recognized password and user name associated with said at least one HVAC device.

2. A system according to claim 1, further comprising:

means residing in said server for checking for messages from said at least one HVAC device; and means residing in said server for sending an alarm message to said entry device when an alarm message is received from said at least one HVAC device.

3. A system according to claim 2, further comprising means for automatically sending alarm messages from said at least one HVAC device through said server to said entry device.

4. A system according to claim 1, further comprising means for automatically updating said stored information on a regular basis in the absence of said message for said entry device.

5. A system according to claim 1, further comprising means for changing settings on said at least one HVAC device from said entry device.

6. A system according to claim 1, wherein said entry device is one of a handheld computer, a cell phone, and a personal data assistant.

7. A system according to claim 1, wherein said communications access includes connections over the Internet.

8. A system according to claim 1, wherein said communications access includes connections over the GSM network.

9. A system according to claim 1, wherein said communications access includes connections over both the Internet and the GSM network.

10. The system of claim 1, wherein status information is stored in a first database and said password and user's name information is stored in a second database.

11. A system for remotely monitoring and controlling at least one HVAC device, comprising:

a server with bi-directional communications access to an entry device and said at least one HVAC device and containing stored information relating to the status of at least one HVAC device and further containing stored information that includes a password and a user name associated with said at least one HVAC device which must be properly identified before stored status information can be accessed by the entry device;

querying means in said server for querying said at least one HVAC device for status information for storage in said server;

means for sending said status information to said entry device in response to said querying means;

means residing in said server for checking for messages from said at least one HVAC device;

means residing in said server for sending an alarm message to said entry device when an alarm message is received from said at least one HVAC device;

means for automatically sending alarm messages from said at least one HVAC device through said server to said entry device;

means for automatically updating said stored information on a regular basis in the absence of said message form said entry device; and means for changing settings on said at least one HVAC device from said entry device.

12. The system of claim 11, wherein status information is stored in a first database and said password and user's name information stored in a second database.

13. A method for remotely monitoring and controlling at least one HVAC device, comprising the steps of:

providing a server with bi-directional communications access to an entry device and said at least one HVAC device and having a first database relating to the status of at least one HVAC device and a second database that includes a password and a user name associated with said at least one HVAC device which must be properly identified before requested status information can be accessed by the entry device;

querying said at least one HVAC device for status information when requested by a message from said entry device; and sending said status information to said entry device in response to said querying means.

14. A method according to claim 13, further comprising the steps of:

checking for messages from said at least one HVAC device;

transferring said messages from said at least one HVAC device to said server; and sending an alarm message from said server to said entry device when an alarm message is received from said at least one HVAC device.

15. A system for remotely monitoring and controlling at least one HVAC device comprising:

a server with a bi-directional communications access connection to an entry device and bi-directional communications access to at least one HVAC device and containing stored status information relating to the status of said at least one HVAC device and further containing stored user information that includes a password and a user name that are associated with said at least one HVAC device which must be properly identified before said stored status information can be accessed by said entry device;

querying means in said server for querying said at least one HVAC device for status information for storage in said server as stored status information; and means for sending said stored status information to said entry device when a message from said entry device to said server includes a recognized password and user name associated with said at least one HVAC device; and means for said entry device to detect a time out event associated with said bi-directional communications access connection.

* * * * *

UNITED STATES PATENT AND TRADEMARK OFFICE
CERTIFICATE OF CORRECTION

| | | |
|---|---|---|
| PATENT NO. | : 7,092,794 B1 | Page 1 of 1 |
| APPLICATION NO. | : 09/679853 | |
| DATED | : October 5, 2000 | |
| INVENTOR(S) | : Mark Alexander Hill et al. | |

It is certified that error appears in the above-identified patent and that said Letters Patent is hereby corrected as shown below:

TITLE: METHOD AND APPARATUS FOR CONNECTING TO HVAC DEVICE i) in Column 6, Line 23. The reference to "said server" is incomplete and should be replaced with --said server; on demand in order to detect a problem associated with the monitoring of the at least one HVAC device as well as to detect any problems with the monitored device itself;--.

ii) in Column 6, Line 55. The reference to "entry device" is incomplete and should be replaced with --entry device; on demand in order to detect a problem associated with the monitoring of the at least one HVAC device as well as to detect any problems with the monitored device itself;--.

iii) in Column 8, Line 3. The reference to "status information; and" is incomplete and should be replaced with --status information; on demand in order to detect a problem associated with the monitoring of the at least one HVAC device as well as to detect any problems with the monitored device itself--.

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,092,794 B1 | Page 1 of 1 |
| APPLICATION NO. | : 09/679853 | |
| DATED | : August 15, 2006 | |
| INVENTOR(S) | : Mark Alexander Hill et al. | |

It is certified that error appears in the above-identified patent and that said Letters Patent is hereby corrected as shown below:

TITLE: METHOD AND APPARATUS FOR CONNECTING TO HVAC DEVICE i)   in Column 6, Line 23. The reference to "said server" is incomplete and should be replaced with --said server; on demand in order to detect a problem associated with the monitoring of the at least one HVAC device as well as to detect any problems with the monitored device itself;--.

ii)   in Column 6, Line 55. The reference to "entry device" is incomplete and should be replaced with --entry device; on demand in order to detect a problem associated with the monitoring of the at least one HVAC device as well as to detect any problems with the monitored device itself;--.

iii)   in Column 8, Line 3. The reference to "status information; and" is incomplete and should be replaced with --status information; on demand in order to detect a problem associated with the monitoring of the at least one HVAC device as well as to detect any problems with the monitored device itself--.

This certificate supersedes Certificate of Correction issued November 14, 2006.

Signed and Sealed this

Second Day of January, 2007

JON W. DUDAS
*Director of the United States Patent and Trademark Office*